Patented Feb. 23, 1937

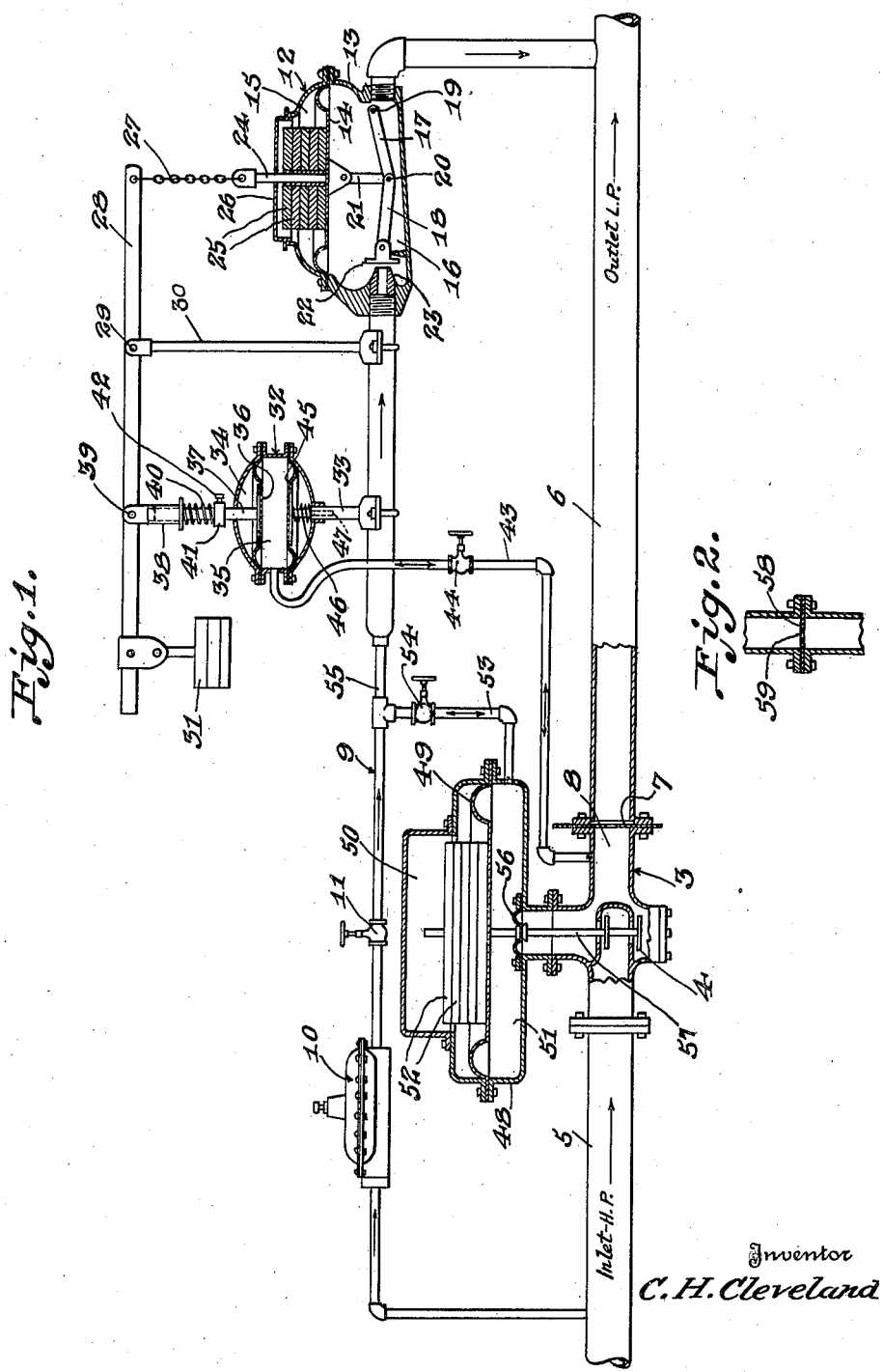

2,071,871

UNITED STATES PATENT OFFICE 2,071,871

FLUID PRESSURE REGULATOR AND FLOW CONTROL DEVICE

Charles H. Cleveland, Detroit, Mich.

Application November 15, 1935, Serial No. 50,041

11 Claims. (Cl. 50—17)

This invention relates to improvements in flow control devices, and more especially to novel means for controlling the flow and pressure of illuminating gas or heating gas supplied to a large number of consumers in a city or the like.

It is well known that in cities or the like where a large number of consumers use gas conveyed by pipe lines, that the flow and pressure in the outlet or low pressure lines has a tendency to fluctuate due to the fact that the pressure is not constant in the inlet or high pressure line and due also to the fact that the volume of gas consumed varies to a great degree, especially during meal hour periods. Many efforts have been made to remedy the disadvantage without a practical solution of the problem, and therefore, the primary purpose of my invention is to furnish simple, durable and practical mechanism which will act to maintain a constant flow and pressure in the low pressure or consumers' lines even though there is great variation in the volume of gas consumed and large fluctuations of the pressure of the gas from the source of supply.

In order that the invention may be clearly understood, it is deemed advisable at the outset to point out the difference in operation of a regulator equipped with flow control means, as compared to one that is not. Briefly, a pressure regulator is designed to maintain a constant pressure at the point where it is located. In a conduit leading away from it, at a point a considerable distance away from the regulator, the pressure fluctuates directly with the volume of fluid flowing through the conduit. This is due to frictional resistance to flow in the conduit. This fluctuation of pressure at points farthest remote from the regulator is the point or points where it is most desired to maintain a uniform pressure, and is the condition which those concerned with the distribution of fluid through a system of conduits have been trying to obtain, and it is what I accomplish by my present improvement, which reverses the usual action of such devices. The pressure in the conduit at the regulator varies or fluctuates with any change in volume of flow, and remains constant at the remote points of the distribution conduit.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a side elevation partly in vertical section of one embodiment of the invention.

Fig. 2 is a sectional view of a modification of a detail.

Referring to the drawing, 3 designates a pipe line that is divided by a flow control device, such as a balanced valve 4, into an inlet or high pressure conduit 5 and an outlet or low pressure conduit 6. Means 7, such as an orifice plate, is arranged in the low pressure line for restricting the volume of flow so as to create in a chamber 8 between the valve and orifice plate, a pressure intermediate between that existing in the high pressure line and the low pressure line.

A by-pass pipe, conduit or passageway is designated 9 and it permits the fluid to flow from the conduit 5 at the up-stream side of the valve 4, to the conduit 6 at the down-stream side of the orifice plate 7, but the flow of the fluid through the by-pass pipe is controlled in a special way. The following control members are interposed in the by-pass pipe in the order named. First, a high pressure stabilizing regulator 10, a needle valve or vent orifice 11 and a low pressure pilot regulator 12. The element 10 may be a conventional stabilizing regulator for reducing the pressure on the fluid before it reaches the valve or orifice 11, and the latter will function to restrict the flow toward the pilot regulator 12. This regulator is preferably constructed as illustrated, that is, it consists of a casing 13 that is divided by a movable partition or diaphragm 14 into first and second chambers 15 and 16. Toggle links 17 and 18 are arranged in the chamber 16 and one of these links is pivotally mounted at 19 on a fulcrum shaft. The links are pivotally connected by a pin 20 which may join these links to a third link 21 that is secured to the central portion of the diaphragm 14. A valve head 22 is carried by the link 18 and it cooperates with a nipple 23 to control the flow of fluid through the by-pass.

Any suitable means may be employed to load the diaphragm 14. For example, the diaphragm may be provided with a post 24 to receive apertured weights 25, and a cover 26 on the casing 12 will permit weights to be added or removed.

The operation of the diaphragm 14 is not only governed by the pressure existing in the chamber 16 but also by the intermediate pressure existing in the chamber 8 and to permit the intermediate pressure to aid in the control, the stem 24 is connected to a flexible element 27, such as a chain, which joins the stem to one end portion of a rocking lever 28. At this point it will be noted that while the valve 22 is moving toward closing position, the stem 24 can rise without disturbing the position of the lever 28, due to the flexible connection 27, but while the valve 22 is moving toward open position under the influence of the weights 25, the chain 27 will tend to pull down on one end of the lever.

The lever is pivotally mounted at 29 on a fulcrum post 30 supported by any suitable means such as the by-pass pipe 9, and the end portion of the lever, opposite to that connected to the chain 27 is provided with a weight mass 31 that is slideable along the lever for counter-balancing purposes.

Movement of the lever is influenced by pressure existing in the intermediate pressure chamber 8 and to this end, a diaphragm motor casing 32 is provided. This casing may be mounted in any suitable way, for example, on a post 33 rising from the by-pass pipe. The interior of this casing is also divided into first and second chambers 34 and 35 by a movable partition or diaphragm 36 of smaller area than the area of diaphragm 14 of the pilot regulator, and such diaphragm is connected to the lever 28 by expansible and contractible means. For instance, a post 37 has its lower end secured to the diaphragm and its upper end slidably engaging the socket 38, pivotally connected at 39 to the lever. A coil spring 40 surrounds the post and bears at one end against the socket and at its opposite end against an abutment collar 41 that is adjustably mounted on the post. The collar may be fixed in any desired position on the post by means of a thumb screw 42, and of course, the spring bearing on the post has a tendency to load the diaphragm 36, but if the diaphragm moves upwardly, such movement can take place without immediately disturbing the position of the lever 28, due to the telescopic joint provided by the parts 37 and 38.

Pressure fluid from the intermediate pressure chamber 8 can move into and out of the chamber 35 through a tube 43 in which is interposed a needle valve 44 to restrict flow and thereby prevent sudden changes in pressure in the chamber 35 due to the opening and closing movements of the main valve 4.

The casing 32 preferably includes a second diaphragm 45 functioning as a flexible wall for the chamber 35 so that chamber acts in the manner of an expansion chamber. A coil spring 46 surrounds a post 47 depending from the diaphragm 45 and tends to yieldingly resist enlargement of the chamber 35.

The main valve 4 is controlled by a pressure reducing regulator of any conventional make or design. For example, a casing 48 may be arranged above the valve and be divided by a movable partition or diaphragm 49 into first and second chambers 50 and 51, the first chamber accommodating suitable loading means, such as weights 52 for the diaphragm, and the other chamber permitting the pressure existing in the medial portion of the by-pass pipe to be felt by the diaphragm 49. For this purpose a tube 53 having a needle valve 54 interposed therein, places the medial portion 55 of the by-pass pipe in communication with the chamber 51. A flexible imperforate packing gasket 56 is arranged on the stem 57 of the main valve to segregate the chambers 51 and 8 from one another, and of course, the valve stem is secured to the diaphragm 49.

Instead of making the parts 11, 44 and 54 as needle valves, each of these parts may be replaced, as shown in Fig. 2, by an orifice plate 58 having an orifice 59 of the proper size to restrict the flow, and at this point it will be noted that the parts 44 and 54 are of vital importance in securing satisfactory operation of the equipment.

From the foregoing it will be noted that the diaphragm motor or power diaphragm 32, together with the weight 31, constitute an auxiliary loading means for the pilot regulator, and that said means is responsive to and actuated by the intermediate pressure in the chamber 8.

In operation, let us assume that gas from a suitable source of supply is entering the conduit 5 of the equipment at a pressure of 50 pounds and it is desired to reduce such pressure and to maintain a pressure of substantially atmospheric in the outlet conduit 6. Under such circumstances the regulator 10 will be set to reduce the pressure of gas flowing through the by-pass pipe to say two pounds, and the flow-restricting member of valve 11 will reduce this pressure to say one-half pound. Under such circumstances the gas would flow past the valve 4 and also through the by-pass pipe 9, and whenever the pressure in the outlet pipe tends to rise, the diaphragm 14 will also have a tendency to close the valve 22. As a result, flow will be restricted through the by-pass pipe, and by means of the tube 53 the by-pass pressure will be felt in the chamber 51, so that the diaphragm 49 acts to move the main valve 4 toward closed position and thereby reduce the flow through the main line and also reduce the pressure in the intermediate chamber 8. Due to the falling pressure in the chamber 8, the diaphragm 36 will have a tendency to move downwardly under the influence of the weight mass 31, and obviously the pressure in the low pressure line will therefore not build up beyond a certain degree. On the other hand when the pressure is reduced in the pipe 6, the pressure in the chamber 16 also reduces and the diaphragm 14 moves downwardly and urges the valve 22 into open position. Then owing to the freer flow of gas through the by-pass pipe, the diaphragm 49 can move downwardly and urge the main valve 4 toward open position with the result that higher pressure will be immediately exerted in the intermediate chamber 8. Of course, this higher pressure will be transmitted by the tube 43 to the diaphragm 36 and this will tend to lift the diaphragm 36 and to lower the chain 27, but as the pressure simultaneously rises in the low pressure line 6, there will be no sudden closing of the valve 22.

It will thus be seen that any increase or decrease of pressure in the intermediate pressure chamber 8 will act, through the power diaphragm 32 and the connections between said diaphragm and the pilot regulator, to cause a proportional increase or decrease of pressure in the low pressure line 6, the maximum and minimum increase or decrease respectively, of course, being predetermined in a manner hereinafter described.

The diaphragm 14 is weighted to the maximum pressure desired in the conduit 6 at any time. The counter weight 31, acting through the bar 28 and chain 27, reduces the weight on the diaphragm 14 to the minimum pressure required in conduit 6. The motor diaphragm 36, acting through its connections on bar 28, with any increase of the intermediate pressure in chamber 8, lifts up on the counter weights and allows the pressure in conduit 6 to increase, but only up to the point of maximum pressure required in conduit 6. This is due to the fact that when the intermediate pressure has reached a point high enough to exert sufficient pressure on the motor diaphragm 36 to lift the entire counter weight, the flexible connection 27 will become slack, and the pressure in conduit 6 will remain at the maximum required, regardless of any increase in pressure which may occur in the intermediate pressure chamber 8. Therefore, it will be seen that the flexible connection 27 is of vital importance as a safety feature, as it prevents the pressure in conduit 6 from exceeding a predetermined maximum, and eliminates the possibility of creating an excessive or dangerously high pressure in said conduit. Furthermore, in case of a break occurring in the conduit 6, the amount of discharge is limited by this same means.

From the foregoing it will be appreciated that I construct the parts and so arrange them that all movements of parts are dampened, which tends to smooth out the operation of the entire assembly and prevent the occurrence of sudden surges or shocks in the low pressure conduit or distribution system. At the same time, I convert into power the intermediate pressure in chamber 8 by applying it to motor diaphragm 36, which causes the pressure in the inlet end of conduit 6 to vary directly with any variation in volume of flow into it, and by doing this, I compensate for any frictional losses as the fluid passes through conduit 6 to a distant point of discharge or consumption, and thereby maintain a constant pressure at distant points of discharge from conduit 6.

While I have disclosed what I now consider to be a preferred embodiment of the invention in such manner that the same may be readily understood by those skilled in the art, I am aware that changes may be made in the details disclosed without departing from the spirit of the invention, as expressed in the claims.

What I claim and desire to secure by Letters Patent is:

1. In combination with a fluid pressure conduit including a high pressure line, a low pressure line, and a master regulator interposed between the two, of means in the low pressure line for restricting the volume of flow so as to create an intermediate pressure, a by-pass pipe for leading fluid from the high pressure line to the low pressure line and having means for controlling said master regulator, a pilot regulator for controlling the flow of fluid through the by-pass pipe and responsive to pressure existing in the low pressure line, said pilot regulator being weighted for maximum pressure required in said low pressure line, and auxiliary loading means having a flexible connection with said pilot regulator and including means responsive to said intermediate pressure, whereby any increase or decrease of said intermediate pressure will act through said auxiliary loading means and said pilot regulator to cause a proportional increase or decrease of pressure in said low pressure line, said auxiliary loading means also including a weight mass for counterbalancing said pilot regulator, whereby when said intermediate pressure acting on said auxiliary loading means exceeds a predetermined pressure, the flexible connection will become slack, thereby preventing further action of said intermediate pressure on said pilot regulator.

2. A combination as claimed in claim 1, including a high pressure stabilizing regulator interposed in the by-pass pipe between the high pressure line and said master regulator.

3. A combination as claimed in claim 1, in which the master regulator includes a diaphragm casing communicating with the by-pass pipe.

4. A combination as claimed in claim 1, in which the auxiliary loading means includes a restricted tube in communication with said intermediate pressure.

5. A combination as claimed in claim 1, including a pivotally mounted lever having one of its ends connected to said pilot regulator and its other end connected to said auxiliary loading means, and a restricted tube connected to said auxiliary loading means and communicating with said intermediate pressure.

6. A combination as claimed in claim 1, including a support, a lever having its medial portion pivotally mounted on the support, a first connection joining the lever at one side of said support to said pilot regulator, a second connection joining said auxiliary loading means to the lever at the opposite side of said support, and a restricted tube connected to said auxiliary loading means and communicating with the intermediate pressure.

7. A combination as claimed in claim 1, including a support, a lever having its medial portion pivotally mounted on the support, a flexible connection joining the lever at one side of said support to said pilot regulator and permitting free movement of the lever and a part of the pilot regulator toward one another, but causing them to move in unison when either one moves away from the other, a second connection joining the auxiliary loading means to the lever at the opposite side of said support, and a restricted tube connected to said auxiliary loading means and communicating with the intermediate pressure.

8. A combination as claimed in claim 1, including a support, a lever having its medial portion pivotally mounted on the support, a flexible connection joining the lever at one side of said support to said pilot regulator and permitting free movement of the lever and a part of the pilot regulator toward one another, but causing them to move in unison when either one moves away from the other, a second connection joining the auxiliary loading means to the lever at the opposite side of said support, said second connection comprising a telescopic joint and cushioning means for said joint, and a restricted tube connected to said auxiliary loading means and communicating with the intermediate pressure.

9. A combination as claimed in claim 1, in which the auxiliary loading means includes a power diaphragm, and expansible means associated with said power diaphragm to give an increase in cubical displacement with any increase in pressure within the power diaphragm.

10. A combination as claimed in claim 1, in which the area of the pressure responsive means of the pilot regulator is greater than the area of the pressure responsive means of the auxiliary loading means.

11. In combination with fluid pressure conduits including a high pressure line, a low pressure line and a balanced control valve interposed between the two, of means in the low pressure line for restricting the volume of flow so as to create an intermediate pressure, a pilot regulator provided with a chamber and a diaphragm, said diaphragm being operatively connected to the control valve, a conduit connecting the chamber of the pilot regulator and the low pressure line beyond said flow restricting means to operate the diaphragm in response to changes in pressure in the low pressure line, a power diaphragm responsive to said intermediate pressure, a conduit placing said power diaphragm in communication with said intermediate pressure and having means for preventing surges in pressure, a support, a lever having its medial portion pivotally mounted on said support, means arranged at one side of said support and connecting the lever to the power diaphragm, a flexible joint connected to the lever at the opposite side of said support, and means operatively connecting the flexible joint to the diaphragm of said pilot regulator whereby to influence the operation of the control valve in response to the intermediate pressure.

CHARLES H. CLEVELAND.